(12) United States Patent
Schütz (10) Patent No.: US 11,130,462 B2
(45) Date of Patent: Sep. 28, 2021

(54) AIRBAG MODULE, STEERING WHEEL AND METHOD FOR CONNECTING AN AIRBAG MODULE TO A STEERING WHEEL

(71) Applicant: TRW AUTOMOTIVE SAFETY SYSTEMS GMBH, Aschaffenburg (DE)

(72) Inventor: Dominik Schütz, Heimbuchenthal (DE)

(73) Assignee: TRW AUTOMOTIVE SAFETY SYSTEMS GMBH, Aschaffenburg (DE)

( * ) Notice: Subject to any disclaimer, the term of this patent is extended or adjusted under 35 U.S.C. 154(b) by 60 days.

(21) Appl. No.: 16/604,581

(22) PCT Filed: Mar. 14, 2018

(86) PCT No.: PCT/EP2018/056432
§ 371 (c)(1),
(2) Date: Oct. 11, 2019

(87) PCT Pub. No.: WO2018/188885
PCT Pub. Date: Oct. 18, 2018

(65) Prior Publication Data
US 2020/0122671 A1   Apr. 23, 2020

(30) Foreign Application Priority Data

Apr. 11, 2017 (DE) .......................... 102017107764.2

(51) Int. Cl.
*B60R 21/203* (2006.01)
(52) U.S. Cl.
CPC ................ *B60R 21/2037* (2013.01)

(58) Field of Classification Search
CPC ................ B60Q 5/003; B60R 21/2037; B60R 21/21658
See application file for complete search history.

(56) References Cited

U.S. PATENT DOCUMENTS 6,675,675 B1 * 1/2004 Sauer .................. B60R 21/2037
                                                                280/731
9,156,400 B2   10/2015 Ishii et al.
(Continued)

FOREIGN PATENT DOCUMENTS

EP            1790536           5/2007

*Primary Examiner* — Paul N Dickson
*Assistant Examiner* — Scott F. Underwood
(74) *Attorney, Agent, or Firm* — Tarolli, Sundheim, Covell & Tummino LLP (57) ABSTRACT

The invention relates to an airbag module for arranging on a steering wheel, a locking element and a contact element being arranged on the airbag module. The locking element can be moved and can adopt an unlocked state, a locked state and an intermediate state between the two, in relation to a catch element. In the intermediate state, in which there is mechanical contact between the locking element and the catch element, there is no electrical contact between the contact element and the locking element. In the locked state, in which the locking element is mechanically coupled to the catch element, there is electrical contact between the contact element and the locking element. In the locked state, when the catch element and the locking element are locked together, the contact element, the locking element and the catch element are electrically interconnected.

22 Claims, 6 Drawing Sheets

(56) References Cited

U.S. PATENT DOCUMENTS

| | | | | |
|---|---|---|---|---|
| 2002/0043786 A1* | 4/2002 | Schutz | ................... | B60Q 5/003 |
| | | | | 280/728.2 |
| 2004/0119582 A1* | 6/2004 | Schutz | ................ | B60R 21/2037 |
| | | | | 340/425.5 |
| 2015/0042079 A1* | 2/2015 | Ishii | ....................... | B60Q 5/003 |
| | | | | 280/728.2 |
| 2016/0347345 A1* | 12/2016 | Obayashi | ............... | B60Q 5/003 |
| 2017/0174166 A1 | 6/2017 | Eireos Garcia | | |

* cited by examiner

AIRBAG MODULE, STEERING WHEEL AND METHOD FOR CONNECTING AN AIRBAG MODULE TO A STEERING WHEEL

RELATED APPLICATIONS

This application corresponds to PCT/EP2018/056432 filed Mar. 14, 2018, which claims the benefit of German Application No. 10 2017 107 764.2 filed Apr. 11, 2017, the subject matter of which are incorporated herein by reference in their entirety.

BACKGROUND OF THE INVENTION

The invention relates to an airbag module, a steering wheel, a subassembly consisting of an airbag module and a steering wheel as well as a method for connecting an airbag module to a steering wheel.

Airbag modules are part of vehicle occupant restraint systems and may be arranged in the steering wheel, for example, to improve the protection of a driver. Further, the airbag module may be used to trigger a horn signal.

Today it is common to couple the airbag module and the steering wheel to each other by means of locking connections to enable easy assembly without the use of complicated screwing connections.

SUMMARY OF THE INVENTION

The object underlying the invention is to provide an airbag module and a steering wheel the correct assembly of which can be easily and reliably ascertained. In addition, a method for producing a (reliably functioning) signal unit is to be suggested.

As regards an airbag module, the object is achieved by the features of claim 1, as regards a steering wheel, the object is achieved by the features of claim 2 and as regards a method for producing a signal unit, the object is achieved by the features of claim 12.

The airbag module according to the invention is designed for being arranged on a steering wheel. On the airbag module a locking element and a contact element are arranged. The locking element is designed to lock together with a catch element arranged on the steering wheel by means of which the airbag module and the steering wheel can be interconnected. The contact element can be electrically connected to a horn contact in order to generate a horn signal. When the catch element and the locking element are locked together, the contact element, the locking element and the catch element are electrically interconnected.

The steering wheel according to the invention is designed to be connected to an airbag module. On the steering wheel a locking element and a contact element are arranged. The locking element is designed to lock together with a catch element arranged on the airbag module by means of which the steering wheel and the airbag module can be interconnected. The contact element can be electrically connected to a horn contact in order to generate a horn signal. When the catch element and the locking element are locked together, the contact element, the locking element and the catch element are electrically interconnected.

A subassembly according to the invention includes an airbag module and a steering wheel which can be interconnected by being locked together. For the locking connection, a locking element may be arranged on the airbag module and a catch element may be arranged on the steering wheel. The subassembly thus can especially show a preferred configuration of an airbag module according to the invention and a corresponding steering wheel. For the locking connection, there may also be arranged a locking element on the steering wheel and a catch element may be arranged on the airbag module. Thus, the subassembly can especially show a preferred configuration of a steering wheel according to the invention and a corresponding airbag module.

It is also imaginable that on each of the steering wheel and the airbag module a locking element and a catch element are arranged to make a respective locking connection. In this case, the subassembly especially shows a preferred configuration of a steering wheel according to the invention and of an airbag module according to the invention.

Advantages and advantageous configurations of the airbag module according to the invention, of the steering wheel according to the invention and of the subassembly according to the invention will be analogously evident from the following description.

Hence, the invention provides an airbag module and, resp., a steering wheel, wherein it can be easily recognized whether the airbag module and the steering wheel are safely, tightly and correctly interconnected. That is to say, the invention enables a horn signal to be generated and to sound only when the steering wheel and the airbag module are interconnected in a correct and error-free manner, viz. when a positive connection is made and, resp., established in a correct and error-free manner between the catch element and the locking element.

Usefully, an electrical connection can be established from the horn contact via the contact element and further via the locking element to the catch element by the correct and completely engaged locking connection. When the locking connection and thus the electrical connection between the contact, locking and catch elements is established, especially a respective horn circuit can be closed, and a horn signal can especially be generated. When, on the other hand, the locking connection is not (fully) established or is not made correctly, there is especially no electrical connection from the horn contact to the catch element. In this case, the respective horn circuit especially cannot be closed, nor can a horn signal be generated.

Thus, the invention usefully enables the horn to be used as an indicator of whether the airbag module and the steering wheel are correctly interconnected, especially whether the locking connection between the catch element and the locking element is correctly made and, resp., established. If so, the horn signal sounds upon blowing the horn. If that is not the case, the horn signal cannot sound.

Consequently, it can be checked easily and quickly whether the steering wheel and the airbag module are safely and tightly interconnected. In particular, neither visual inspection of the connection between the steering wheel and the airbag module nor complicated inspection is required in the course of which the individual elements are attempted to be scanned using a tool. Since the steering wheel and the airbag module are usually precisely interconnected, such visual inspection is hardly or not at all possible and usually only little or no clearance is given to insert any appropriate tools.

The invention enables the locking connection to be easily checked acoustically with the aid of the horn that is present anyway. Especially no additional elements are required exclusively for said check, but the check is possible by elements which are used for mechanically connecting the steering wheel and the airbag module and for generating the horn signal anyway.

For example, said check may be carried out directly during a production or mounting process of the subassembly consisting of the steering wheel and the airbag module. Moreover, said check is equally possible when the subassembly is already in the field and is already installed in a vehicle, for example. For instance, the connection can be checked straightforwardly in the course of repair works or maintenance of the respective vehicle.

Inversely, the horn and, resp., the missing sound of the horn signal upon blowing the horn is especially indicative of an incorrect connection between the airbag module and the steering wheel. When, for example, a driver of a respective vehicle (e.g. after maintenance or repair work of the vehicle) notices that the horn function is no longer given, in this way the driver's attention appropriately can be drawn to correctly re-establish the connection between the airbag module and the steering wheel.

The airbag module can be especially arranged on the steering wheel such that it is movable relative to the latter, especially toward the steering wheel. The airbag module is expediently movable in a direction parallel to a longitudinal axis of the steering wheel and, resp., a steering column. Alternatively, the airbag module can also be arranged at a fixed distance from the steering wheel, and a cover of the airbag module can be formed to be movable toward the steering wheel. Said direction in which the airbag module or, resp., the cover is movable will hereinafter be referred to as honking direction without loss of generality. Moving the airbag module in said honking direction advantageously serves for closing or short-circuiting the contact element with the horn contact and thus for generating the horn signal.

The contact element serves particularly as a counter-contact for the horn contact. Thus, advantageously the catch element and the locking element are not used as contact surfaces which are to be brought into contact for blowing the horn. When the contact element is arranged on the airbag module, the horn contact is arranged especially on the steering wheel, or vice versa. For blowing the horn, advantageously the contact element can be brought directly into contact with the horn contact and thus short-circuited by, moving the airbag module and, resp., the cover thereof in the honking direction. It is also imaginable that the contact element is connected to further elements and one or more of said elements can be brought directly into contact with the horn contact. In this case, the contact element is especially not brought into direct physical contact with the horn contact for blowing the horn, but it is electrically connected to the horn contact via said further elements. For example, the contact element may be mechanically connected to an actual counter-contact, e.g. by means of a plug, snap-on and/or clamping connection. When blowing the horn, in this case said counter-contact can be directly brought into contact with the horn contact and thus can be short-circuited.

In particular, the catch, locking and contact elements as well as the horn contact are part of the horn circuit. Especially, an electrical connection can be made from said elements to one or more electric potentials. In the horn circuit a signal means acoustically emitting the horn signal is especially further integrated. When the locking connection is made, there are, especially permanently, an electrical contact between the locking element and the catch element and especially equally a permanent mechanical contact between said two elements.

After the locking connection has been correctly established, the airbag module or the cover is especially in an idle position at a predetermined distance from the steering wheel. Advantageously, at the steering wheel and/or at the airbag module at least one spacer can be provided by which the airbag module is kept in said idle position. For example, spring elements or other plastically deformable elements may be provided as said spacers. After blowing the horn, the airbag module or the cover is moved away from the steering wheel by said spacers especially opposite to the honking direction, until the airbag module or the cover is in the idle position again.

According to an especially advantageous configuration, when the contact element, the locking element and the catch element are electrically interconnected, i.e. especially when the locking connection is correctly made (and thus especially a positive connection is established), a horn function can be activated, especially by making a contact between the contact element and the horn contact. By electrically interconnecting the contact element, the locking element and the catch element, when the locking connection is correctly made, in the case of short-circuit between the contact element and the horn contact the respective horn circuit can be closed and the horn signal can be generated. With a correctly established locking connection, the horn function is thus especially activated, and the horn signal can be generated. When the locking connection is not correctly established, however, the horn function is not activated, and the horn signal cannot be generated. Especially with such faulty locking connection, no electrical connection is given from the horn contact to the catch element so that neither the respective horn circuit can be closed, nor can the horn signal be generated.

Advantageously, in an unlocked state in which there is no mechanical contact between the locking element and the catch element, there is an electrical contact between the contact element and the locking element. In said unlocked state, the steering wheel and the airbag module are especially separated from each other. The locking element is in said unlocked state especially before the locking connection is made. Hence, before the airbag module and the steering wheel are interconnected, an electrical contact is advantageously made between the locking element and the contact element. Especially in said unlocked state, the locking element is in an initial state or in an initial position in which there is an electrical contact between the locking element and the contact element.

According to the invention, in a locked state in which the locking element is mechanically coupled to the catch element, there is an electrical contact between the contact element and the locking element. In this context, a mechanical coupling between the catch element and the locking element is especially understood to be the fact that the locking connection is successfully made and that the catch element and the locking element are especially mechanically engaged and are especially positively and/or non-positively connected to each other. In said locked state, thus the steering wheel and the airbag module are interconnected especially tightly and correctly. Appropriately, the locking element is in said locked state after the locking connection has been successfully made. In particular, the locking element in said locked state is equally in its initial state or its initial position.

Further, according to the invention, in an intermediate state of locking or unlocking in which there is a mechanical contact between the locking element and the catch element, there is no electrical contact between the contact element and the locking element. Such mechanical contact in this context is understood especially to be an interaction between the locking element and the catch element while they lock together, in order to obtain the mechanical coupling thereof.

Thus, the locking element is in said intermediate state especially while the locking connection is made, i.e. while the locking element turns from the unlocked to the locked state. In said intermediate state, the locking element is especially not in its initial state or its initial position. Since in said intermediate state there is no electrical connection between the locking element and the contact element, in this case especially no electric connection can be made between the locking element, the contact element and the catch element, either. When the locking element thus is in the intermediate state, the corresponding horn circuit cannot be closed, nor can any horn signal be generated, even if the contact element and the horn contact are brought into contact. Thus, it can be recognized by means of the horn whether the locking connection is correctly made or not. It can especially be recognized by a missing horn function that the locking element is in the intermediate state, that the locking connection is not correctly established and that thus the steering wheel and the airbag module are not correctly interconnected. When the horn function is given, the correctly established locking connection can be concluded.

Advantageously, the locking element and the contact element can be interconnected via a detachable mechanical connection by which especially the electrical connection thereof can be made. In particular, the locking element and the contact element are interconnected in the locked and unlocked states via said detachable mechanical connection. In the intermediate state, said mechanical connection is especially detached. For example, said detachable connection can be realized by means of a plug, snap-on and/or clamping connection.

Preferably, when the locking element is in a deflected or partly displaced state—relative to its initial position in the unlocked state—, there is no electrical contact between the contact element and the locking element. In the initial position, as described above, there is especially an electrical contact between the locking element and the contact element. Advantageously, a corresponding horn circuit be closed, and a horn signal can be generated only when the locking element is in its initial position. Should that not be the case and the locking element be deflected or partly displaced relative to its initial position, expediently the horn circuit cannot be closed due to the missing electrical contact between the contact element and the locking element. Thus, the horn and, resp., a missing sound of the horn signal when the horn contact and the contact element are closed, is indicative of the fact that the locking element is not in its initial position.

Of preference, a horn function is not activated when the locking element is in a non-locked state, especially in the unlocked state and/or in the intermediate state. By a missing electrical connection between the contact element, the locking element and the catch element in said non-locked state the corresponding horn circuit is especially not closable. In particular, the horn function is activated in the locked state only, when said electrical connection is made and the horn circuit is thus closable. Consequently, the horn signal is indicative of whether the locking element is in the locked state and thus the locking connection is correctly made.

In accordance with a preferred configuration, the locking element is arranged on the airbag module or on the steering wheel such that the locking element can be moved or deformed by interaction with the catch element before or during the locking connection is made from the/an unlocked state in which the locking element and the contact element are electrically interconnected to the/an intermediate state in which there is no electrical contact between the locking element and the contact element. As explained above, the locking element and the contact element can be connected especially via a detachable mechanical connection. Especially by the interaction and, resp., the mechanical contact of the locking element and the catch element, said mechanical connection between the locking element and the contact element is detached and thus the electric connection thereof is interrupted. Therefore, the locking element is advantageously deflected from its initial position and is moved or deformed into the intermediate state by the interaction.

Advantageously, the locking element is arranged on the airbag module or on the steering wheel such that, when or after making the locking connection, the locking element can be moved or deformed from the intermediate state to the locked state. At the time when the locking connection is successfully made, especially the interaction or the mechanical contact between the locking element and the catch element ends and said two elements are mechanically coupled. Thus, especially also the deflection of the locking element ends so that the latter is moved or deformed from the intermediate state back to its initial position again. Hence, when or after the locking connection has been made, the locking element and the contact element are mechanically interconnected again, and the electrical contact thereof is reestablished.

Especially the locking element is consequently in the locked state when the locking connection is correctly made. Unless the locking connection has been established correctly and the locking connection has been made faultlessly, the locking element is still in interaction and in mechanical contact with the catch element and thus still in the intermediate state. In this case, expediently no electric connection can be made between the contact element, the locking element and the catch element and the horn circuit cannot be closed. The missing sound of the horn signal when moving the airbag module or the cover in the honking direction thus is especially indicative of a locking connection that is not made correctly.

Hence, according to an especially preferred configuration, before the locking connection is made, especially when the steering wheel and the airbag module are separated from each other, an electrical contact is made between the locking element and the contact element. While the locking connection is made, said electrical contact is advantageously interrupted. When or after the locking connection is made, the electrical contact is advantageously reestablished.

Advantageously, the catch element is electrically connectable or connected to an electric potential, especially to ground potential, especially to vehicle ground. Of preference, the horn contact is electrically connectable or connected to a second electric potential directly or via a signal unit, for example to a vehicle battery. It is understood that also the horn contact can be connectable or connected to ground potential, especially to vehicle ground. Equally, the catch element can also be connectable or connected to a vehicle battery. When the locking connection is successfully made, by moving the airbag module or the cover in the honking direction and by short-circuiting the contact element and the horn contact thus the corresponding horn circuit can be closed between the first and second potentials via the catch element, the locking element, the contact element, the horn contact and, where necessary, the signal unit.

When the locking connection is correctly made, i.e. when the airbag module and the steering wheel are interconnected, there is especially permanently an electrical contact from the contact element to the first electric potential, especially even when the airbag module is in its idle position and the horn is not actuated. When the airbag module or the cover is moved in the honking direction, the locking element remains especially in its locked state and there is permanently a direct mechanical and electrical contact between the catch element and the locking element.

Preferably, the locking element is fastened by a first end on the airbag module or the steering wheel. A second end of the locking element is preferably movable relative to the/a first end, especially by bending or displacing, especially movable in a plane perpendicularly to a honking direction. In particular, the locking element can be deflected from its initial state into the intermediate state by such a movable second end by interaction with the catch element when the locking connection is made. Analogously, the locking element can be moved to its initial state again by the movable second end when or after the locking connection is made.

The honking direction is especially parallel to a mounting direction along which the airbag module and the steering wheel are moved toward each other to make the locking connection. During assembly of the airbag module and the steering wheel, the second end of the locking element is thus deflected advantageously perpendicularly to said mounting direction by interaction with the catch element.

Advantageously, the locking element is connectable by the/a second end to the contact element, especially by hooking the second end onto the contact element. By connecting the second end to the contact element usefully the mechanically detachable connection between the locking element and the contact element can be made. By moving the second end while making the locking connection the mechanical and electrical connection between the locking element and the contact element can thus be detached, for example by unhooking the second end that was hooked to the contact element before. Analogously, by re-hooking the second end when or after the locking connection is made, the electrical connection between the contact element and the locking element can be reestablished.

Of preference, the contact element and the locking element are arranged on a rear of the airbag module or on the steering wheel.

Preferably, the contact element and the locking element are arranged on the rear of the airbag module and said rear of the airbag module can be arranged on the steering wheel. Advantageously, the contact element and the locking element may also be arranged on the steering element and the catch element is preferably arranged on the rear of the airbag element by which the airbag module can be arranged on the steering wheel.

According to a preferred configuration, the airbag module or the steering wheel includes, especially on its rear, an opening through which the catch element can be inserted at least partially into an outer surface of the airbag module or of the steering wheel. While the locking connection is made, the catch element is usefully inserted through said opening. In particular, the locking element is arranged at or in the vicinity of said opening so that it can interact with the catch element while the locking connection is made.

According to an advantageous configuration, the catch element is a catch hook or a catch clip. Advantageously, while the locking connection is made, the locking element is deflected from its initial state by interaction with a slope of the catch hook or the catch clip.

Of advantage, the locking element is a spring element, especially a leg spring or a wire spring. In the form of such spring element, the locking element can be deflected, especially deformed from its initial state while the locking connection is made. The locking element can be automatically returned to its initial state again by an appropriate spring force, when or after the locking connection is made.

According to a preferred configuration, the contact element is a wire or a sheet metal. In the form of a wire or sheet metal, the contact element can be arranged on the airbag module or the steering wheel especially in an uncomplicated and space-saving manner.

It is pointed out that also plural locking connections can be made, to which end expediently plural locking elements and catch elements may be arranged on the airbag module or the steering wheel. Especially pairs of a locking element and a catch element each are designed to lock together. Especially plural or advantageously all the given pairs of catch element and locking element may be configured according to the present description.

In accordance with an advantageous configuration, on the airbag module or on the steering wheel exactly one locking element or exactly two locking elements or exactly three locking elements are arranged. Advantageously, on the steering wheel or on the airbag module exactly one catch element or exactly two catch elements or exactly three catch elements are arranged. Preferably on the airbag module and/or on the steering wheel exactly one horn contact, exactly two horn contacts or exactly three horn contacts are arranged. Especially, each of said plural locking elements can be connected to at least one respective contact element. Expediently for each locking element exactly one contact element is provided. For each of said plural contact elements expediently one respective horn contact is provided. When the respective locking connection is made between the respective catch element and locking element, advantageously the respective contact element, locking element and catch element are electrically interconnected.

Especially for each pair of a locking element and a catch element preferably a respective contact element and a respective horn contact and thus a closable horn circuit portion are provided. Hence, advantageously plural respective horn signals can be generated independently of each other. When the respective locking connection of a pair of locking element and catch element is successfully made, advantageously a respective horn function is activated. Expediently said individual horn functions can be activated independently of each other. Thus, when plural pairs of catch element and locking element and thus plural locking connections are provided, advantageously each of said different locking connections can be individually checked. When a specific area of the airbag module in which the respective pair of catch element and locking element is arranged is moved in the honking direction, it can be checked by way of the sounding or non-sounding horn signal whether the respective locking connection of said pair is correctly made or not. In addition, the individual closable horn circuit portions are preferred to be connected in series so that a horn signal can be generated only when all provided locking connections between the module and the steering wheel are correctly made.

The invention further relates to a method for connecting an airbag module to a steering wheel. Advantages and advantageous configurations of the method according to the invention are analogously resulting from the foregoing description of the airbag module according to the invention, of the steering wheel according to the invention and of the subassembly according to the invention.

Within the scope of the method, an airbag module, preferably a preferred configuration of an airbag module according to the invention, and a steering wheel, preferably a preferred configuration of a steering wheel according to the invention, are interconnected by means of a locking connection. For said locking connection either a locking element is arranged on the airbag module and a catch element is arranged on the steering wheel, or for said locking connection a locking element is arranged on the steering wheel and a catch element is arranged on the airbag module, analogously to the foregoing description. It is understood that also plural locking connections can be made and, consequently, plural catch elements and locking elements can be provided on the steering wheel and/or on the airbag module, analogously to the foregoing description.

The method comprises the following steps: Making an electrical contact between the locking element and a contact element. Interrupting the electrical contact between the locking element and the contact element while the locking connection is made, preferably by interaction of the locking element and the catch element. Reestablishing the electrical contact between the locking element and the contact element when or after the locking connection is made.

After making the locking connection, in another optional step the airbag module or a cover of the airbag module can be moved in a honking direction relative to the steering wheel toward the latter to close an electrical contact between the contact element and a horn contact for generating a horn signal. In this way, it can be checked whether the locking connection or locking connections made are made completely, i.e. correctly.

According to the invention, before the locking connection is made, especially when the steering wheel and the airbag module are separated from each other, an electrical contact thus is made between the locking element and the contact element. While the locking connection is made, said electrical contact is interrupted so that a corresponding horn circuit cannot be closed and the horn function is disconnected. When the locking connection is successfully made, the electrical contact is reestablished, thus activating the horn function. After the locking connection is successfully made, the horn function is activated, and the horn signal can be generated.

Further preferred embodiments are the subject matter of the subclaims.

BRIEF DESCRIPTION OF THE DRAWINGS

In the following, the invention shall be illustrated in detail by way of example embodiments with reference to the enclosed schematic drawings, wherein.

DESCRIPTION

Figure 1A:
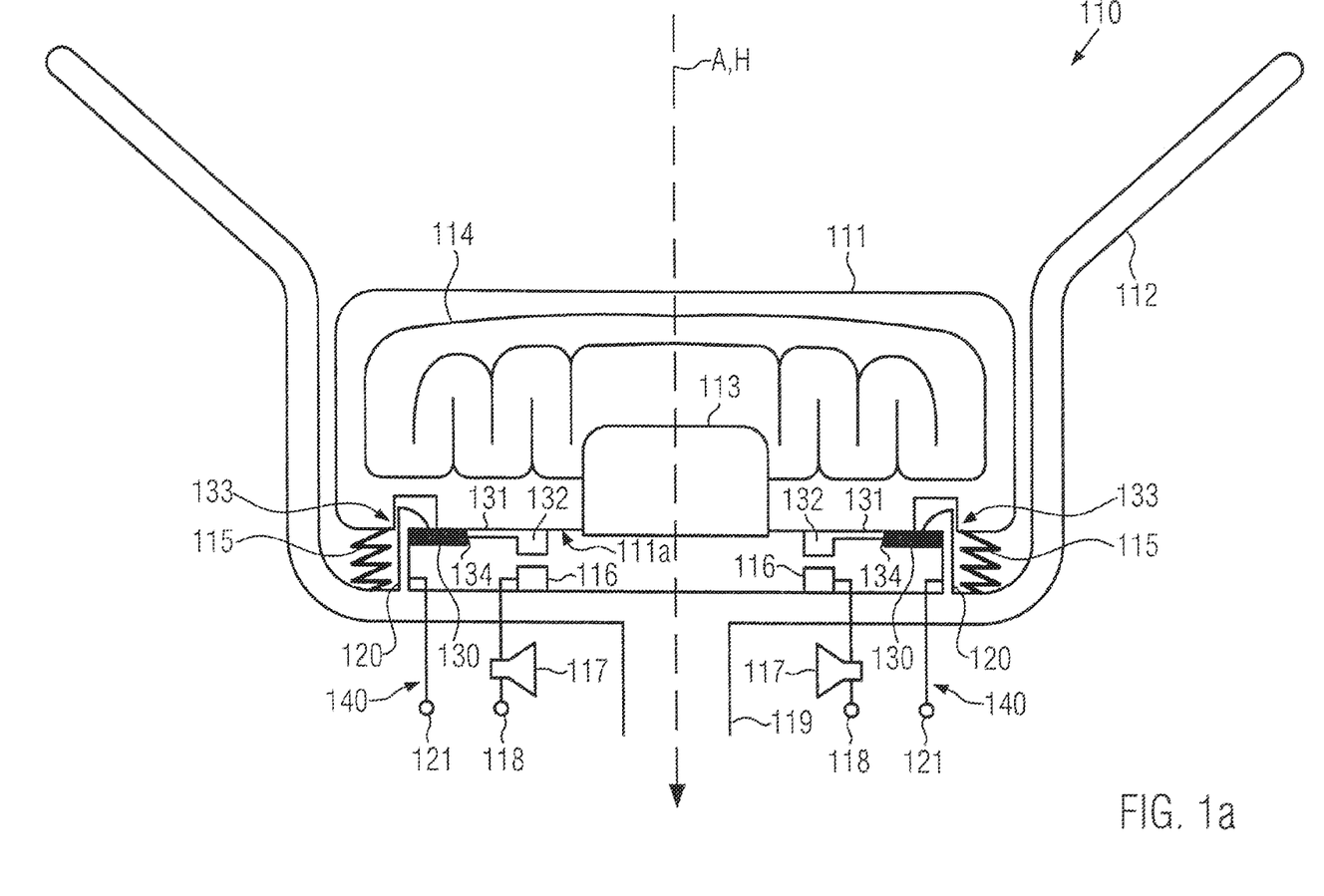
FIGS. 1a and 1b: each show a configuration of a subassembly according to the invention comprising an airbag module according to the invention and/or a steering wheel according to the invention in a schematic sectional view.

In FIG. 1a a first preferred configuration of a subassembly according to the invention is schematically shown and denoted with 110. The subassembly 110 comprises a preferred configuration of an airbag module 111 according to the invention as well as a steering wheel 112.

The steering wheel is connected to a steering column 119. In the airbag module 111 there are arranged a gas generator 113 and an airbag 114 that is inflatable by the gas generator 113. It is understood that the airbag module 111 and the steering wheel 112 may include even further elements.

The airbag module 111 and the steering wheel 112 are connectable or connected to each other by means of locking connections in the shown example. A first component of said locking connections is formed by at least two, preferably three, catch elements 120 in the form of catch hooks arranged on the steering wheel 112. A second component of said locking connections is formed by one or more locking elements 130 arranged at a lower side or rear 111a of the airbag module 111 which are in the form of individual leg springs, for example. Alternatively, also a spring wire is imaginable into which the catch element(s) can be hooked. Through recesses or openings 133 on the rear of the airbag module 111 the catch hooks 120 can be inserted at least partially into an outer surface of the airbag module 111. It is also imaginable, as an alternative, to dispose the locking elements on the inner face of the airbag module opposite to the lower side 111a. At least in this case, the catch elements pass at least partially through the openings 133 through the rear side 111a.

At least one, preferably all, of the locking elements 130 electrically conductive at least in portions are in electrical contact with or electrically conductively connected to an electrically conductive contact element 131. In the shown embodiment, the contact elements 131 are electrically interconnected and are made, preferably integrally in the form of a conductor path, from pre-shaped electrically conductive flat material, especially (stamped) sheet metal. Alternatively, also contact elements 131 made from wire material or interconnected via one or more (flexible) wire portions are provided.

Figure 1B:
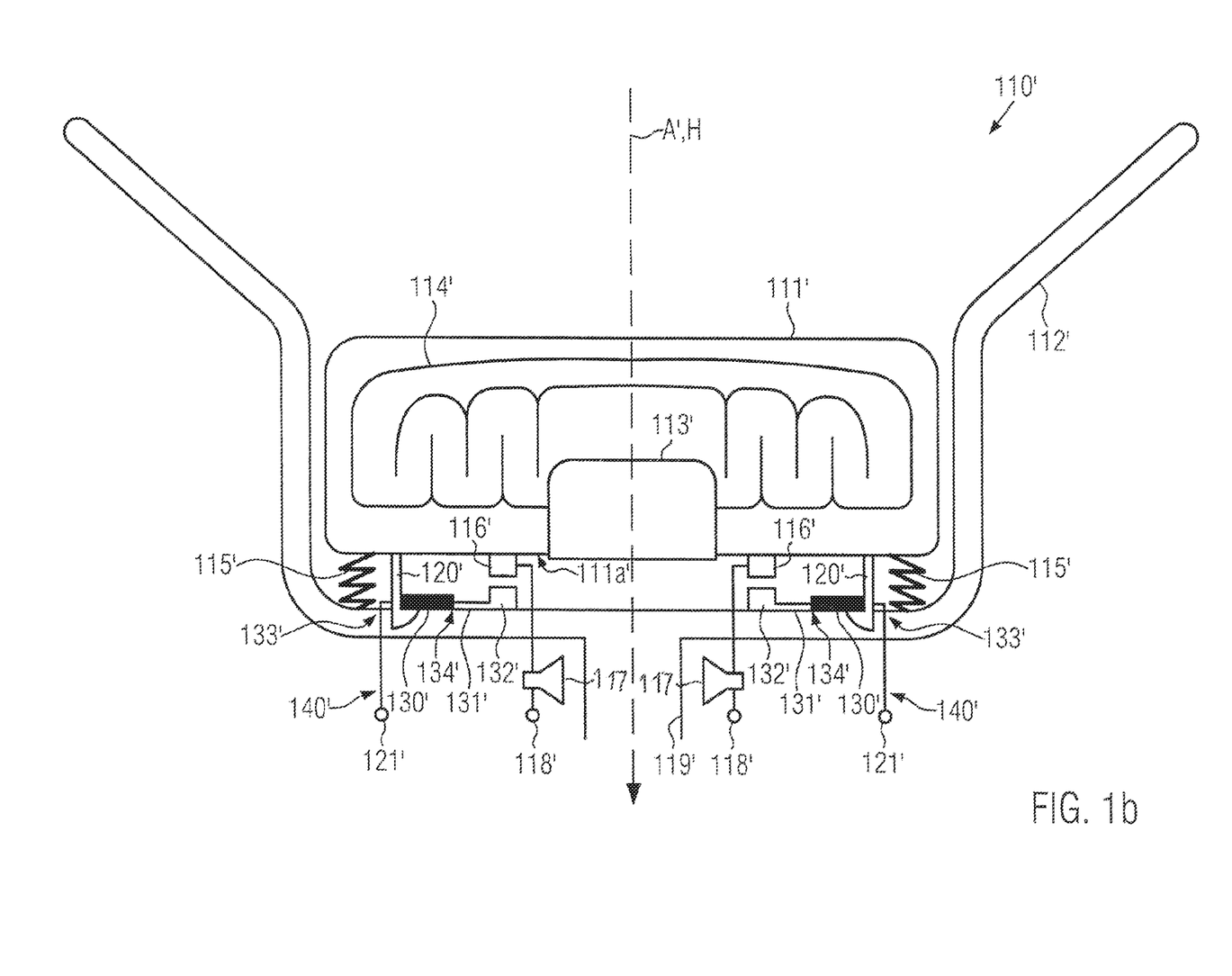

The contact elements 131 form part of a horn circuit 140. In the embodiments shown in FIGS. 1 and 2, a respective end of the contact elements 131 is in the form of a pin 132, e.g. by means of a rivet. It is also imaginable that a pin is formed as a separate component and is arranged on the airbag module 111 and that the contact element 131 and the pin 132 are mechanically and/or electrically interconnected.

On at least one, preferably on each of the contact elements 131 a contact point 132 is provided especially in the form of a contact projection or contact extension 134 on which the locking element 131 electrically conductive on its part abuts or to which the latter is connected to be electrically conductive.

In the engaged state of the subassembly 110 i.e. when the locking connection is made between the catch hooks 120 of the steering wheel 112 and the leg springs 130 of the airbag module 121, the contact element 131, the leg spring 130 and the catch hook 120 electrically conductive on its part are thus electrically interconnected. Each of the catch hooks 120 is electrically connectable or connected to a first electric potential 121, for example (directly or indirectly) to the potential of a vehicle battery or to vehicle ground.

In the subassembly 110 shown in FIG. 1a, on the steering wheel 112 horn contacts 116 are arranged opposite to each of the pins 132 and spaced from the latter as a further part of the horn circuit 140. Each of said horn contacts 116 is connectable or connected to a second electric potential 118, for example to vehicle ground or to the potential of the vehicle battery.

The horn circuit 140 further includes a signal unit 117, e.g. a "horn" and/or electronics which controls and, resp., initiates or stops a sound signal or another signal depending on the contact of one or more of the horn contacts 116 with one or more of the pins 132 (closing and opening of the horn circuit 140).

For closing (and opening) the horn circuit 140, the airbag module 111 shown in FIG. 1a is arranged on the steering wheel 112 in such a manner that it can be moved toward the steering wheel 112 in a (shown) honking direction H, especially in parallel to the steering column 119 (so-called "floating module" principle). Said honking direction H is especially defined also in parallel to a longitudinal axis A of the steering wheel 112, wherein, in accordance with the invention, the honking direction H is intended to comprise also directions that enclose an angle of up to 20°, preferably up to 10°, with the longitudinal axis A and, resp., with the steering column 119. By a number of spacers 115, especially in the form of spring elements, e.g. in the form of spiral springs, the airbag module 111 is maintained in an idle position facing the steering wheel 112 so that a free end of the pin or pins 132 is located at a predetermined distance from the (respectively) correspondingly opposite free end of the horn contact(s).

By moving the airbag module 111 in the honking direction, the pins 132 of the contact elements 131 are brought into contact with the horn contacts 116, whereby the horn circuit 140 is closed and, consequently, a horn signal can be or is generated.

In FIG. 1b another preferred configuration of a subassembly according to the invention is shown and denoted with 110'. The subassembly 110' comprises a preferred configuration of a steering wheel 112' according to the invention as well as an airbag module 111'.

Elements of FIG. 1b that analogously correspond to elements from FIG. 1a are denoted with like reference numerals of FIG. 1a that have been provided with an apostrophe.

As is evident from FIG. 1b, in contrast to the subassembly 110 from FIG. 1a, as a first component of the locking connection(s) on the steering wheel 112' one or more locking elements 130' are arranged, e.g. in the form of individual leg springs. As a second component of the locking connection(s), on the lower side or rear 111a' of the airbag module 111' at least two, preferably three, catch elements are disposed in the form of catch hooks 120'. Through openings 133' in an outer surface of the steering wheel 112' the catch hooks 120' can be inserted at least partially into the steering wheel 112'.

On the steering wheel 112' further contact elements 131' having pins 132' are arranged which are configured, analogously to the configuration shown in FIG. 1a, e.g. as conductor path of pre-shaped electrically conductive flat material and are especially electrically interconnected.

The contact elements 131' form a (steering wheel-side) part of a horn circuit 140'. Another (module-side) part of the horn circuit 140' is formed by horn contacts 116' opposite to each of the pins 132' and spaced apart therefrom. In contrast to the subassembly 110 from FIG. 1a, the horn contacts 116' according to the subassembly 110' shown in FIG. 1b are arranged on the lower side or rear 111a' of the airbag module 111'. Analogously to the subassembly 110 from FIG. 1a, each of the catch elements 120' and the horn contacts 116' of the subassembly 110' shown in FIG. 1b is connectable or connected to an electric potential 121' and, resp., 118'. Furthermore, also the horn circuit 140' includes or is connectable to a signal unit 117.

Analogously to the subassembly 110 shown in FIG. 1a, also in the shown example of FIG. 1b the airbag module 111' can be moved toward the steering wheel 112' in the honking direction H for closing and/or opening the horn circuit 140' ("floating module" principle). The elastic spacers 115' help to maintain the airbag module 111' in an idle position so that a free end of the pin(s) 132' is located at a predetermined distance from the (respectively) correspondingly opposite free end of the horn contact(s) 116'.

The functioning of said embodiment according to FIG. 1b substantially corresponds to the embodiment described by way of FIG. 1a and will be explained in more detail further below in connection with the description of FIGS. 3 and 4.

According to another preferred configuration, the subassembly may also be designed to comprise a horn device operating in accordance with the so-called "floating cover" principle according to which the airbag module is arranged so that it is not movable but stationary and, resp., at a fixed distance (in the mounted state) from the steering wheel and a cover of the airbag module oriented to the driver side is movable toward the steering wheel to close the horn circuit. In other words, compression of the cover and the portion of the airbag module comprising the lower side causes the electric horn circuit to be closed in order to generate a horn signal.

Figure 2:
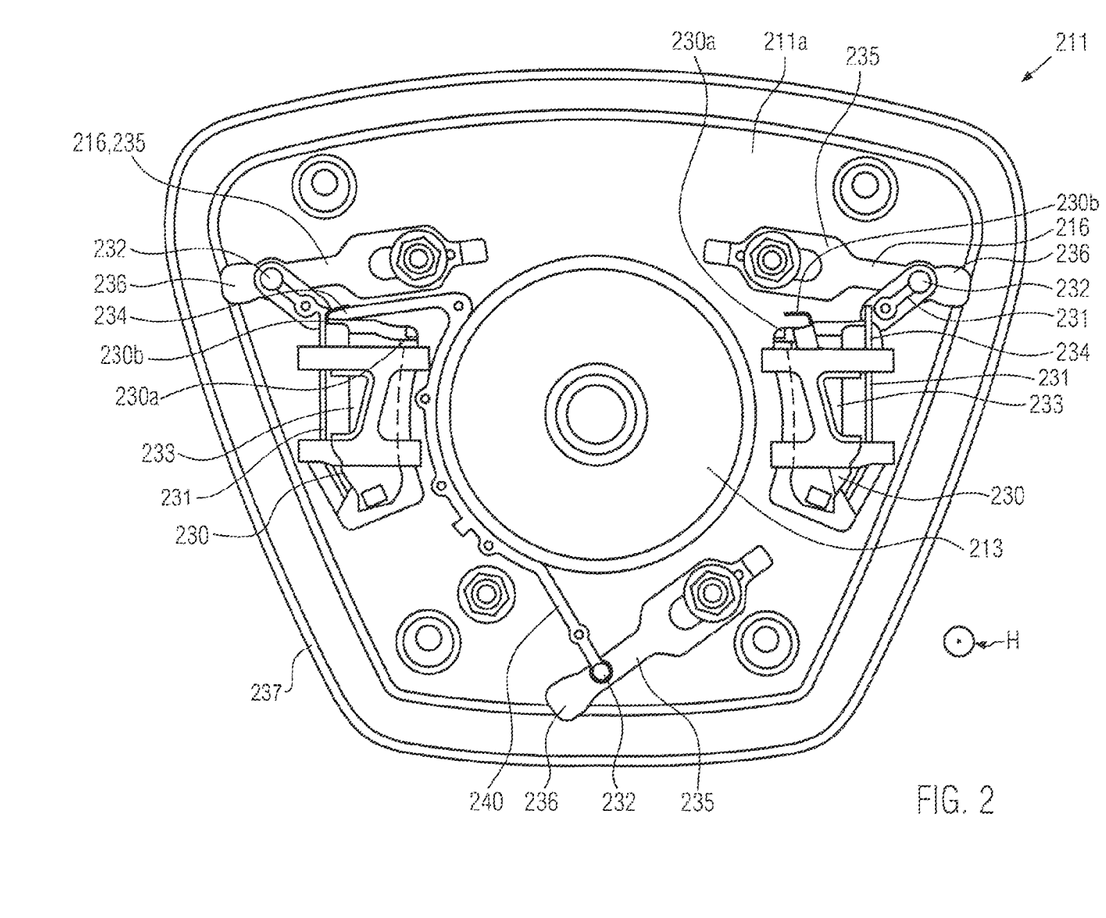
FIG. 2: shows a preferred configuration of an airbag module according to the invention in a schematic bottom view.

A preferred configuration of such airbag module according to the invention, which is configured according to the "floating cover" principle, is shown in FIG. 2 in a schematic bottom view and is denoted with 211. The airbag module 211 is designed to form another preferred configuration of a subassembly according to the invention with an appropriate steering wheel.

In FIG. 2, elements corresponding analogously to elements from FIG. 1a are denoted with the reference numerals of FIG. 1a, increased by the value 100.

Analogously to the airbag module 111 shown in FIG. 1a, also the airbag module 211 shown in FIG. 2 has locking elements 230 on its lower side 211a which, in this example, are in the form of two leg springs. The locking elements 230 are designed to make a locking connection with catch elements, e.g. catch hooks, disposed at a corresponding steering wheel.

Through recesses or openings 233 on the rear or lower side 211a of the airbag module 211 a respective dedicated catch hook can be inserted at least partially to lock together with the respective locking element 230.

Moreover, on the lower side 211a there are arranged contact elements 231, 231' which, in the shown example, are formed integrally in the form of a conductor path of pre-shaped electrically conductive flat material, especially (stamped) sheet metal. Each of the locking elements 230 is electrically connectable to a respective one of the contact elements 231, 231'. For this purpose, preferably at each of the contact elements 231, 231' a respective contact point 234 is provided, especially in the form of a contact projection or contact extension, to which the respective electrically conductive locking element 231, 231' is electrically connectable.

The locking elements 230 formed as leg springs in the embodiments described here are arranged on the airbag module 211 such that a first end 230a of the leg spring 230 is fastened to the lower side 211a of the airbag module 11 and a second end 230b of the leg spring 230 is movable relative to the first end 230a (toward the latter). Said second end 230b is movable especially in the plane of the lower side 211a (or a plane spanned in parallel thereto) of the airbag module 211, i.e. in a plane perpendicularly to the honking direction.

The leg spring 230 shown on the left in FIG. 2 is shown in the illustrated example in an initial state in which the second end 230b of said leg spring is not deflected and is in electrical connection with the corresponding left contact element 231. The corresponding second end 230b of said locking element 230 thus abuts on the contact point 234 of the left contact element 231 and establishes an electrically conducting connection.

The leg spring 230 shown on the right in FIG. 2 in this example is shown in an intermediate state in which the leg spring 230 is deformed, especially deflected from its initial state. In said intermediate state, the second end 230b of said right locking element 230 does not abut on the contact point 234 of the right contact element 231' so that, in the illustrated state, the right locking element 230 is not electrically connected to the right contact element 231'.

When corresponding catch hooks (not shown) of the steering wheel are inserted through the openings 233 to make the locking connections, the leg springs 230 are deflected from their initial state into said intermediate state.

In the embodiment shown in FIG. 2, a total of exactly three horn contacts are shown (top left, top right and bottom center). However, merely two or even four horn contacts are also imaginable. In a (shown) embodiment with three horn contacts and only two locking connections it is advantageous to provide one of the contact elements 231, 231' (here the one arranged on the left) for two of the horn contacts. (In the case of four horn contacts, preferably each of the contact elements 231, 231' will have to be provided for two horn contacts). Accordingly, the contact element 231' has two ends 232 each being in the form of a pin 232, for example by means of a rivet.

According to the shown embodiment with three horn contacts, the one end of the contact element 231 arranged on the right in FIG. 2 is in the form of a pin 232. Each of the ends shaped as a pin 232 is arranged at a defined distance below the lower side 211a of the airbag module 211. Between the lower side 211a of the airbag module 211 and each pin 232 a respective elastic element 235, especially an electrically conducting spring element 235, is disposed. In the shown example, the elastic elements 235 are in the form of leaf springs. The elastic elements 235 are coupled to each other via an electrically conducting connection (not shown), e.g. made from wire or flat metal, and are electrically connectable or connected to a second electric potential 218, e.g. to vehicle ground or the potential of the vehicle battery.

Each of the elastic elements 235 has a free end 236 that protrudes from an outer lateral contour of the lower side 211a of the airbag module 211 and overlaps an element (in ring shape here) of a driver-side cover 237 of the airbag module 211 such that, when the cover 237 is pressed down in the honking direction H, the respective free end 236 of the elastic elements 235 is pressed away from the lower side 211a. In this way, a portion 216 of the elastic element 235 adjacent to the free end 236 which is arranged between the lower side 211a of the airbag module 211 and the pin 232 spaced apart therefrom and acts as horn contact is pressed against the free end of the pin 232 so that an electrical contact is made and the horn circuit 240 is closed.

Analogously to the foregoing explanations with respect to FIGS. 1a and 1b, in a state of the airbag module 211 locked with a steering wheel, viz. when the locking connection is made between the leg springs 230 of the airbag module 221 and the corresponding catch hooks of the steering wheel, the contact element 231, the leg spring 230 and the electrically conductive catch hook are electrically interconnected. The catch hooks are especially electrically connectable or connected to a first electric potential, for example (directly or indirectly) to the potential of a vehicle battery or to vehicle ground.

As explained already, the airbag module 211 shown in FIG. 2 is configured according to the "floating cover" principle. A cover 237 arranged around the airbag module and facing the driver is movable relative to the lower side 211a of the airbag module 211. In the locked state between the airbag module 211 and the corresponding steering wheel, the cover 237 is thus movable in a honking direction toward the steering wheel to close the horn circuit 240. Analogously to the foregoing explanations with respect to FIGS. 1a and 1b, the honking direction H may extend especially in parallel to a longitudinal axis of the corresponding steering wheel or else in directions enclosing an angle up to 20°, preferably up to 10°, with the longitudinal axis.

By the specific arrangement and configuration of the contact elements, the locking elements and the catch elements of the preferred configurations of airbag modules and steering wheels according to the invention shown in FIGS. 1a, 1b and 2, it can be easily checked whether the locking connections between the respective catch and locking elements are correctly made. Furthermore, while establishing the locking connection, the electric connection between the locking elements and the contact elements is enabled to be disconnected and to be reconnected after making the locking connection, as shall be explained in the following with respect to FIGS. 3 and 4.

Figure 3:
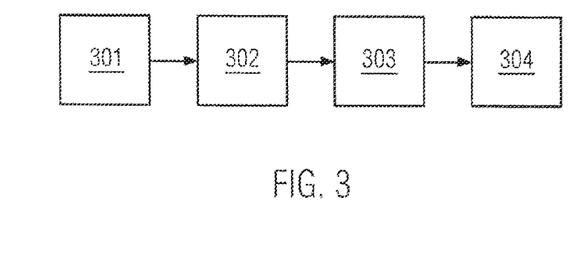
FIG. 3: shows a preferred configuration of a method according to the invention as a schematic block diagram.

In FIG. 3, a preferred embodiment of a method according to the invention is schematically illustrated as a block diagram. In each of the FIGS. 4a to 4d, individual elements of a preferred configuration of a subassembly according to the invention are schematically shown during different steps of said method shown in FIG. 3.

The following explanations are intended to apply analogously to a preferred configuration of airbag modules and, resp., steering wheels according to the invention, as shown in each of the FIGS. 1a, 1b and 2. The elements shown in FIGS. 4a to 4d accordingly may correspond to the respective analogous elements of the preferred configurations of airbag modules and steering wheels according to the invention shown in the FIG. 1a, 1b or 2.

In the FIGS. 4a to 4d, elements analogously corresponding to elements from FIG. 1a are denoted with the respective reference numerals used in FIG. 1a increased by the value 300. Elements in the FIGS. 4a to 4d which analogously correspond to elements from FIG. 2 are denoted with the respective reference numerals used in FIG. 2 increased by the value 200.

In the course of the preferred configuration of the method according to the invention, an airbag module is connected to a steering wheel to form a subassembly and a locking connection is made between corresponding locking elements and catch elements.

In a method step 301, before said locking connection is established, an electrical contact is made between the locking elements and contact elements disposed on the airbag module or on the steering wheel. The airbag module and the steering wheel are not connected to each other but are separated from each other in step 301.

Figure 4A:
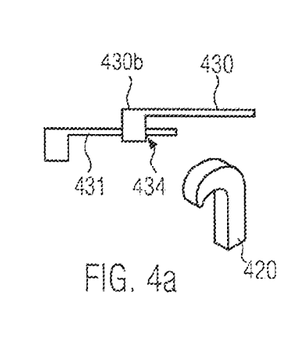
FIGS. 4a to 4d: schematically show elements of a preferred configuration of a subassembly according to the invention during different method steps of a preferred embodiment of a method according to the invention.

In FIG. 4a, a catch element in the form of a catch hook 420, a locking element in the form of a leg spring 430 and a contact element in the form of a wire or a flat metal 431 are schematically shown during said method step 301, i.e. before the locking connection is made. There is no mechanical contact between the locking element 430 and the catch element 420. While the locking element and the contact element are arranged on the airbag module, the catch element is arranged on the steering wheel (corresponding to the embodiment according to FIG. 1a), or vice versa (corresponding to the embodiment according to FIG. 1b).

The wire 431 is mechanically and electrically connected to the leg spring 430. The second end 430b of the leg spring 430 is resiliently adjacent, while being biased, to the contact point 434 of the wire 431. The leg spring 430 is in its initial state and in an unlocked state (not coupled to the catch hook).

For making the locking connection, the catch hook 420 is moved relative to the leg spring 430 toward the latter in a mounting direction that corresponds especially to the honking direction.

Figure 4B:
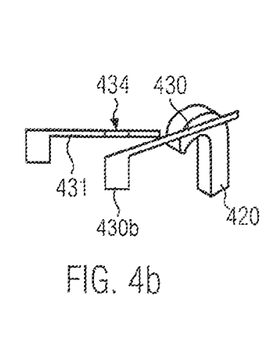

In a method step 302, the electrical contact between the locking element 430 and the contact element 431 is interrupted while the locking connection is made. In FIG. 4b, the catch hook 420, the leg spring 430 and the wire 431 are shown during said method step 302, viz. while the locking connection is made.

The locking element 430 and the catch element 420 are interacting during the method step 302. Said interaction and, resp., said corresponding mechanical contact between the catch hook 420 and the leg spring 430 causes the second end 430b of the leg spring to be deflected or moved. The second end 430b is no longer adjacent to the contact point 434, thereby the electric connection between the leg spring 430 and the wire 431 being interrupted. Thus, the locking element 430 is moved, by interaction or mechanical contact with the catch element 420, from its initial state and, resp., from the unlocked state to an intermediate state.

In said intermediate state, no horn signal can be generated as the interrupted electrical connection of the leg spring 430 and the wire 431 prevents a closed circuit between the electric potentials 418 and 421 from being generated.

Figure 4C:
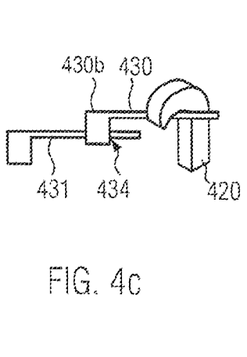
Figure 4D:
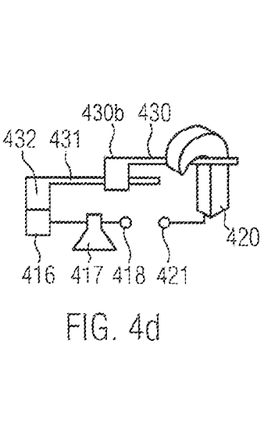

In a method step 303, when or after the locking connection is made, the electrical contact between the locking element 430 and the contact element 431 is re-established. In FIG. 4c the catch hook 420, the leg spring 430 and the wire 431 are shown during said method step 303 after the locking connection has been made.

The locking element 430 and the catch element 420 now are mechanically coupled, the locking element 430 is in a locked state. By spring force of the leg spring 430, the second end 430b is moved back to its initial state, after the locking connection has been made, and presses against the wire 431 again, thus causing the second end 430b to abut on the contact point 434 again and the leg spring 430 and the wire 431 to be electrically reconnected. Now there is an electrical connection between the wire 431, the leg spring 430, the catch hook 420 and the potential 421. The horn function now is activated, and the horn circuit now can be closed.

In an optional method step 304, a horn signal is generated, e.g. by moving the respective airbag module 111, 111' or the cover 237 of the respective airbag module 211 in the honking direction H, thus causing the pin 132, 132', 232 and the horn contact 116, 116', 216 to electrically contact each other. As is evident from FIG. 4d, the pin 432 of the wire 431 is connected to the horn contact 416, thereby closing the horn circuit between the electric potentials 418 and 421. The horn signal is generated and acoustically emitted by the signal unit 117.

Figure 5:
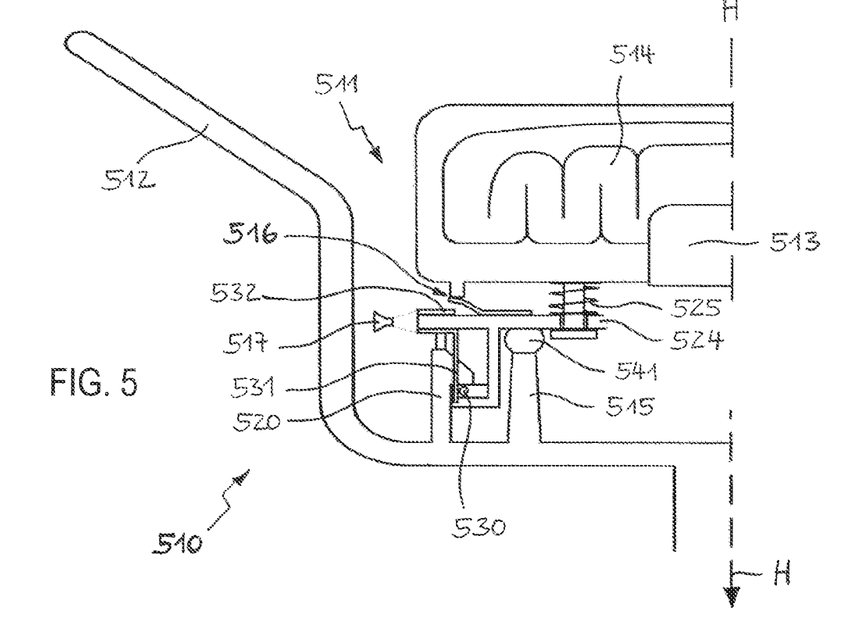
FIG. 5: shows another preferred configuration of a subassembly according to the invention in a schematic sectional view.

FIG. 5 shows an alternative and especially preferred subassembly 510 having a steering wheel 512 and an airbag module 511 for arranging on the steering wheel 512.

On the airbag module 511 a locking element 530 and a contact element 531 are arranged, wherein the locking element 530 can lock together with a catch element 520 arranged on the steering wheel 512 by which the airbag module 511 and the steering wheel 512 are interconnectable.

According to FIG. 5, the locking element 530 is a movable elastic spring element and can adopt an unlocked state, a locked state as well as an intermediate state therebetween relative to the catch element 520 which is in the form of a rigid catch hook here.

In this way, the general locking structure is designed analogously to the embodiment according to FIG. 1a. Alternatively imaginable is also a locking structure in which the locking element 530 as well as the contact element 531 are provided on the steering wheel 512 and the catch element 520 is provided on the airbag module 511, analogously to the subassembly according to FIG. 1b. Further, also mixed forms of said locking structures may be employed, as a matter of course.

In contrast to the embodiments according to FIGS. 1a and 1b, the relative movement for triggering the vehicle horn in the subassembly 510 according to FIG. 5 does not take place in the area of the locking connection between the steering wheel 512 and the airbag module 511 but within the airbag module 511; concretely speaking between a steering wheel-side module plate 524 that also includes the locking element 530 and the contact element 531 and the remainder of the airbag module 511. As an alternative, the relative movement may also take place, however, for example between an occupant-side module cover and the remainder of the airbag module 511. As will be explained in the following, the design according to FIGS. 5 to 9 guarantees especially high functional safety of the vehicle horn, when the subassembly 510 is correctly mounted, wherein regarding the other structural configuration and the general operating principle also the foregoing remarks on the FIGS. 1 to 4 are explicitly referred to.

The subassembly 510 is shown in a mounted unactuated initial state according to FIG. 5. The locking element 530 is in its locked state so that the airbag module 511 is correctly engaged in the steering wheel 512. The horn contact 516 is spaced apart from the contact element 531 so that a horn circuit 540 (schematically indicated in FIG. 9) is not closed and consequently the signal unit 517 outputs no horn signal.

Each of the FIGS. 6 to 9 shows a cutout of the subassembly 510 according to FIG. 5 and illustrates different steps for mounting the airbag module 511 to the steering wheel 512.

Figure 6:
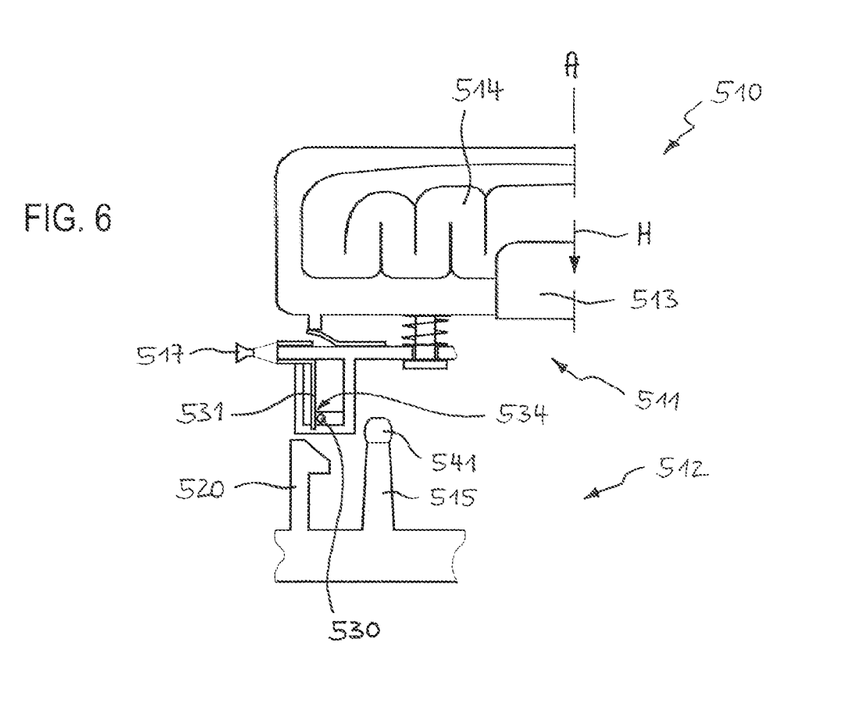
FIG. 6: shows the subassembly according to FIG. 5 in an unlocked state.

In FIG. 6, the separate airbag module 511 is shown before it is mounted on the steering wheel 512. The subassembly 510 and, resp., the locking element 530 are in an unlocked state in which there is no mechanical contact between the locking element 530 and the catch element 520. However, in the unlocked state according to FIG. 6, there is an electrical contact between the locking element 530 and the contact element 531. Especially, the contact element 531 in the form of a wire or sheet metal forms a stop against which the locking element 530 in the form of a spring element is pressed.

Figures 7, 8, 9:
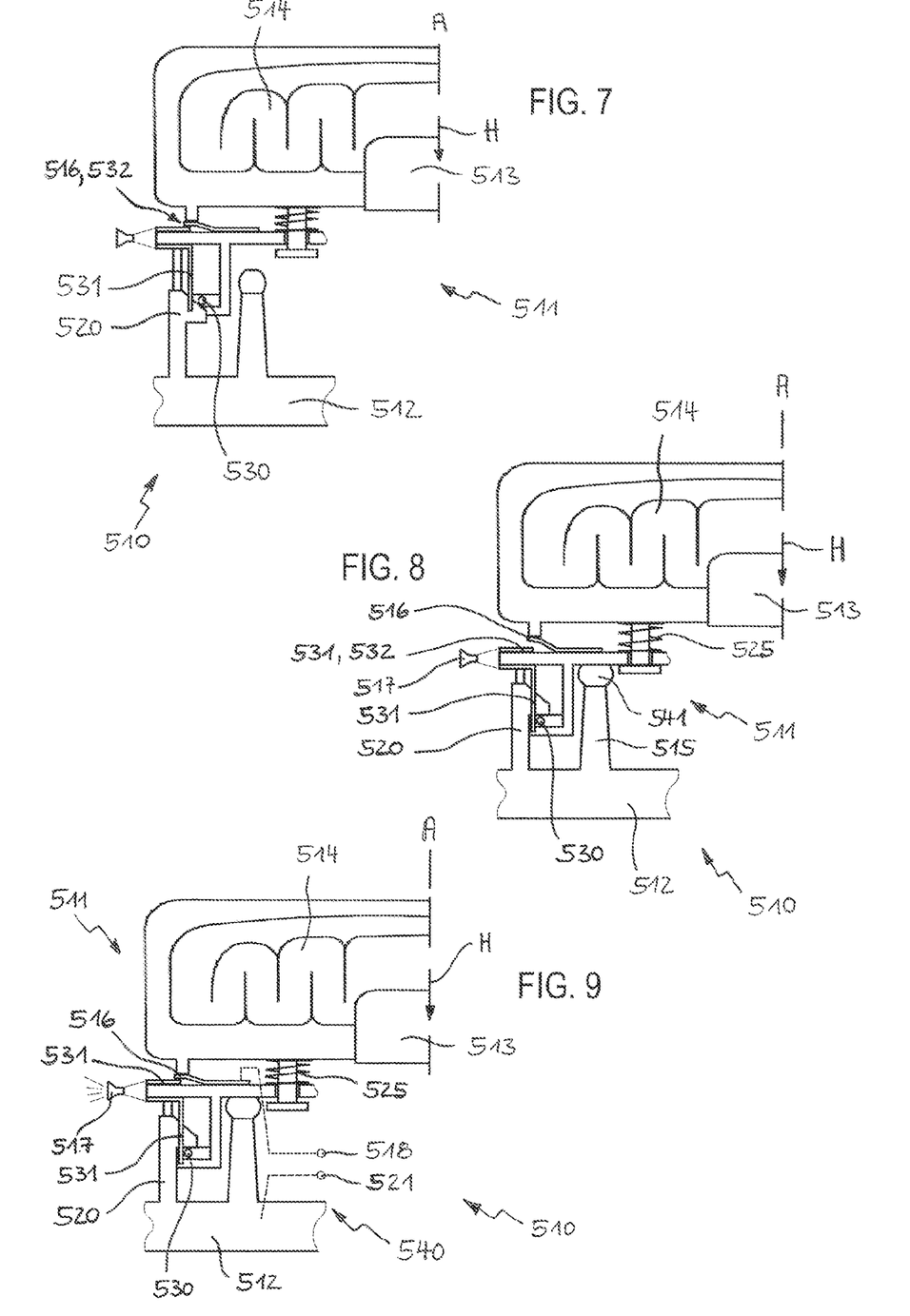
FIG. 7: shows the subassembly according to FIG. 5 in an intermediate state when mounting the airbag module on the steering wheel.
FIG. 8: shows the subassembly according to FIG. 5 in a locked state.
FIG. 9: shows the subassembly according to FIG. 5 in a locked state with the signal unit being triggered.

FIG. 7 shows an intermediate state when locking the airbag module 511 to the steering wheel 512, where the catch element 520 of the steering wheel 512 is designed as a largely rigid catch hook. When axially pressing the airbag module 511 onto the steering wheel 512, the locking element 530 slides along a slope of the catch element 520 while being elastically deformed and, in so doing, moves away from the contact element 531, Consequently, in said intermediate state there is a mechanical contact between the locking element 530 and the catch element 520 but no more electrical contact between the locking element 531 and the contact element 530.

In other words, the horn circuit 540 is interrupted when the locking element 530, starting from its initial position shown in FIG. 6, is in a deflected or partly displaced state.

In the non-locked state of the locking element 530, especially in the unlocked state and/or in the intermediate state, a horn function consequently cannot be activated even when the horn contact 516 contacts the end 532 of the contact element 531, as shown in FIG. 7.

FIG. 8 finally shows a locked state of the subassembly 510 and, resp., of the locking element 530 in which the airbag module 511 is correctly engaged and mounted on the steering wheel 512. The locking element 530 is electrically connected as well as mechanically coupled to, especially engaged in, the catch element 520, wherein again there is an electrical contact also between the locking element 530 and the contact element 531. After correct engagement, the locking element 530 in its locked state according to FIG. 8 adopts especially the same position relative to the contact element 531 as in the unlocked state according to FIG. 6.

In the shown embodiment, a spacer 515 having an elastic portion 541 is provided. As indicated in FIG. 8, the portion 541 is elastically deformed when the airbag module 511 is engaged in the steering wheel 512 so that axial bias builds up in the locking connection. In this way, in the driving operation rattling noise between the locking element 530 and the catch element 520 can be avoided. The vehicle horn is actuated in this case via a separate horn spring 525 and thus independently of the spacer 515. The axial bias provided by the spacer 515 is especially higher than a resistance of the horn spring 525 so that, even when the horn is actuated, no relative movement will occur between the locking element 530 and the catch element 520. Accordingly, in the locked state permanent electrical contact between the locking element 530 and the catch element 520 is ensured, which has a positive effect on the functional safety of the vehicle horn in the correctly mounted state of the subassembly 510.

In the locked state of the subassembly 510, thus the catch element 520 is reliably electrically connected to the contact element 531 via the locking element 530. Moreover, the contact element 531 is electrically connectable to a horn contact 516 in order to generate a horn signal.

As schematically indicated in FIG. 9, the catch element 520 is connected to an electric potential 521, especially to ground potential such as the vehicle ground, wherein the horn contact 516 is connected to a second electric potential 518, especially the vehicle battery.

Axial pressure acting on the airbag module 511, especially on an occupant-side module cover of the airbag module, according to FIG. 9 causes the horn spring 525 to be deformed in the axial honking direction H, until electrical contact is established between the contact element 531 and the horn contact 516 and the signal unit 517 outputs a signal.

In the afore-described constructional configuration of the subassembly 510, the function of the vehicle horn consequently allows to easily and quickly check correct assembly of the airbag module 511 on the steering wheel 512. Only when the airbag module 511 is correctly engaged, i.e. the locking element 530 in its locked state abuts on the contact element 531 via the contact point 534 and moreover is in electrical contact with the catch element 520, can a horn signal be heard. If the vehicle horn does not work when the horn is actuated, this is indicative of incorrect or insufficient engagement of the airbag module 511.

LIST OF REFERENCE NUMERALS 110, 110' subassembly
111, 111' airbag module
111a, 111a' lower side or rear of the airbag module
112, 112' steering wheel
113, 113' gas generator
114, 114' airbag
115, 115' spacer, spring
116, 116' horn contact
117, 117' signal unit
118, 118' electric potential
119, 119' steering column
120, 120' catch element, catch hook
121, 121' electric potential
130, 130' locking element, leg spring
131, 131' contact element, wire
132, 132' end of the contact element, pin
133, 133' opening
134, 134' contact point
140, 140' horn circuit
A, A' longitudinal axis
H honking direction
211 airbag module
211a lower side or rear of the airbag module
213 gas generator
216 horn contact as portion of the elastic element 235
218 electric potential
230 locking element, leg spring
230a first end of the locking element
230b second end of the locking element
231, 231' contact element, wire
232 end of the contact element, pin
233 opening
234 contact point
235 elastic element, leaf spring
236 free end of the elastic element
237 cover of the airbag module
301 to 304 method steps
420 catch element, catch hook
430 locking element, leg spring
430b second end of the locking element
431 contact element, wire
432 end of the contact element, pin
434 contact point
416 horn contact
417 signal unit
418 electric potential
421 electric potential 510 subassembly
511 airbag module
512 steering wheel
513 gas generator
514 airbag
515 spacer
516 horn contact
517 signal unit
518 electric potential
520 catch element
521 electric potential
524 module plate
525 horn spring
530 locking element
531 contact element
532 end of the contact element, pin
534 contact point
540 horn circuit
541 elastic portion

The invention claimed is:

1. An airbag module (111, 211, 511) for arranging on a steering wheel (112, 512),
a locking element (130, 230, 430, 530) and a contact element (131, 231, 431, 531) being arranged on the airbag module (111, 211, 511),
the locking element (130, 230, 430, 530) being designed to lock together with a catch element (120, 420, 520) arranged on the steering wheel (112, 512) by means of which the airbag module (111, 211, 511) and the steering wheel (112, 512) can be interconnected,
wherein the locking element (130, 230, 430, 530) can be moved and can adopt an unlocked state, a locked state and an intermediate state between the unlocked stated and the locked state, in relation to the catch element (120, 420, 520),
wherein, in the intermediate state in which there is mechanical contact between the locking element (130, 230, 430, 530) and the catch element (120, 420, 520), there is no electrical contact between the contact element (131, 231, 431, 531) and the locking element (130, 320, 430, 530), whereas, in the locked state in which the locking element (130, 230, 430, 530) is mechanically coupled to the catch element (120, 420, 520), there is electrical contact between the contact element (131, 231, 431, 531) and the locking element (130, 230, 430, 530),
wherein, in the locked state when the catch element (120, 420, 520) and the locking element (130, 230, 430, 530) are locked together, the contact element (132, 232, 432, 532), the locking element (130, 230, 430, 530) and the catch element (120, 420, 520) are electrically interconnected,
wherein the contact element (131, 231, 531) can be electrically connected to a horn contact (116, 216, 416, 516) in order to generate a horn signal.

2. The airbag module (111, 211, 511) according to claim 1 wherein when the contact element (131, 131', 231, 431, 531), the locking element (130, 130', 230, 430, 530) and the catch element (120, 120', 420, 520) are electrically interconnected, the horn signal can be activated.

3. The airbag module (111, 211, 511) according to claim 1,
wherein in the unlocked state in which there is no mechanical contact between the locking element (130, 130', 230, 430, 530) and the catch element (120, 120', 420, 520), there is electrical contact between the contact element (131, 131', 231, 431, 531) and the locking element (130, 130', 230, 430, 530), and/or
wherein, when the locking element (130, 130', 230, 430) is in a deflected or partly displaced state relative to an initial position in the unlocked state, there is no electrical contact between the contact element (131, 131', 231, 431, 531) and the locking element (130, 130', 230, 430, 530), and/or
wherein, when the locking element (130, 130', 230, 430, 530) is in a non-locked state, the horn signal cannot be activated.

4. The airbag module (111, 211, 511) according to claim 1, wherein the locking element (130, 130', 230, 430, 530) is arranged on the airbag module (111, 211, 511) so that the locking element (130, 130', 230, 430, 530) is movable and deformable by interaction with the catch element (120, 120', 420, 520), before or while a locking connection is made, from the unlocked state in which the locking element (130, 130', 230, 430, 530) and the contact element (131, 131', 231, 431, 531) are electrically interconnected to the intermediate state in which there is no electrical contact between the locking element (130, 130', 230, 430, 530) and the contact element (131, 131', 231, 431, 531), and/or in that the locking element (130, 130', 230, 430, 530) is movable or deformable from the intermediate state to the locked state, when or after the locking connection is made.

5. The airbag module (111, 211, 511) according to claim 1, wherein the catch element (120, 120', 420, 520) is electrically connectable or connected to an electric potential (121, 121', 421, 521), and wherein the horn contact (116, 116', 216, 416, 516) is electrically connectable or connected to a second electric potential (118, 118', 418, 518) directly or via a signal unit (117, 117', 417, 517).

6. The airbag module (111, 211, 511) according to claim 1,
wherein the locking element (130, 130', 230, 430, 530) is fastened by a first end (230a, 430a) to the airbag module (111, 211, 511), and
wherein a second end (230b, 430b) of the locking element (130, 130', 230, 430, 530) is movable relative to the first end (230a, 430a), and
wherein the locking element (130, 130', 230, 430, 530) is connectable by the second end (230b, 430b) to the contact element (131, 131', 231, 431).

7. The airbag module (111, 211, 511) according to claim 1,
wherein the contact element (131, 131', 231, 431, 531) and the locking element (130, 130', 230, 430, 530) are arranged on a rear of the airbag module (111, 211, 511), and
wherein the airbag module (111, 211, 511) includes an opening (133, 133', 233) through which the catch element (120, 120', 420, 520) can be inserted at least partly into an outer surface of the airbag module (111, 211, 511).

8. The airbag module (111, 211, 511) according to claim 1,
wherein the catch element (120, 120', 420, 520) is a catch hook or a catch clip, and
wherein the locking element (130, 130', 230, 430, 530) is a spring element, and
wherein the contact element (131, 131', 231, 431, 531) is a wire or a sheet metal.

9. The airbag module (111, 211, 511) according to claim 1,
wherein exactly one locking element (130, 130', 230, 430, 530) or exactly two locking elements (130, 130', 230, 430, 530) or exactly three locking elements (130, 130', 230, 430, 530) is/are arranged on the airbag module (111, 211, 511), and wherein exactly one catch element (120, 120', 420, 520) or exactly two catch elements (120, 120', 420, 520) or exactly three catch elements (120, 120', 420, 520) is/are arranged on the steering wheel (112'), and wherein that exactly one horn contact (116, 116', 416, 516) or exactly two horn contacts (116, 116', 416, 516) or exactly three horn contacts (116, 116', 416, 516) is/are arranged on the steering wheel (112').

10. A subassembly (110, 110', 510) comprising the airbag module (111, 111', 211, 511), according to claim 1, and the steering wheel (112, 112').

11. A steering wheel (112') which is designed to be connected to an airbag module (111'), a locking element (130', 430) and a contact element (131', 431) being arranged on the steering wheel (112'), the locking element (130', 430) being designed to lock together with a catch element (120', 420) arranged on the airbag module (111') by means of which the steering wheel (112') and the airbag module (111') can be interconnected, wherein the locking element (130', 430) can be moved and can adopt an unlocked state, a locked state and an intermediate state between the unlocked stated and the locked state, in relation to the catch element (120', 420), wherein, in the intermediate state in which there is mechanical contact between the locking element (130', 430) and the catch element (120', 420), there is no electrical contact between the contact element (131', 431) and the locking element (130', 430), whereas, in the locked state in which the locking element (130', 430) is mechanically coupled to the catch element (120', 420), there is electrical contact between the contact element (131', 431) and the locking element (130', 430), wherein, in the locked state when the catch element (120', 420) and the locking element (130', 430) are locked together, the contact element (131', 431), the locking element (130', 430) and the catch element (120', 420) are electrically interconnected, wherein the contact element (131', 431) can be electrically connected to a horn contact (116', 416) in order to generate a horn signal.

12. The steering wheel (112') according to claim 11, wherein when the contact element (131, 131', 231, 431, 531), the locking element (130, 130', 230, 430, 530) and the catch element (120, 120', 420, 520) are electrically interconnected, the horn signal can be activated.

13. The steering wheel (112') according to claim 11, wherein in the unlocked state in which there is no mechanical contact between the locking element (130, 130', 230, 430, 530) and the catch element (120, 120', 420, 520), there is electrical contact between the contact element (131, 131', 231, 431, 531) and the locking element (130, 130', 230, 430, 530), and/or, when the locking element (130, 130', 230, 430) is in a deflected or partly displaced state relative to an initial position in the unlocked state, there is no electrical contact between the contact element (131, 131', 231, 431, 531) and the locking element (130, 130', 230, 430, 530), and/or, when the locking element (130, 130', 230, 430, 530) is in a non-locked state, the horn signal cannot be activated.

14. The steering wheel (112') according to claim 11, wherein the locking element (130, 130', 230, 430, 530) is arranged on the steering wheel (112') so that the locking element (130, 130', 230, 430, 530) is movable and deformable by interaction with the catch element (120, 120', 420, 520), before or while a locking connection is made, from the unlocked state in which the locking element (130, 130', 230, 430, 530) and the contact element (131, 131', 231, 431, 531) are electrically interconnected to the intermediate state in which there is no electrical contact between the locking element (130, 130', 230, 430, 530) and the contact element (131, 131', 231, 431, 531), and/or in that the locking element (130, 130', 230, 430, 530) is movable or deformable from the intermediate state to the locked state, when or after the locking connection is made.

15. The steering wheel (112') according to claim 11, wherein the catch element (120, 120', 420, 520) is electrically connectable or connected to an electric potential (121, 121', 421, 521), and/or wherein the horn contact (116, 116', 216, 416, 516) is electrically connectable or connected to a second electric potential (118, 118', 418, 518) directly or via a signal unit (117, 117', 417, 517).

16. The steering wheel (112') according to claim 11, wherein the locking element (130, 130', 230, 430, 530) is fastened by a first end (230a, 430a) to the steering wheel (112'), and a second end (230b, 430b) of the locking element (130, 130', 230, 430, 530) is movable relative to the first end (230a, 430a), and the locking element (130, 130', 230, 430, 530) is connectable by the second end (230b, 430b) to the contact element (131, 131', 231, 431).

17. The steering wheel (112') according to claim 11, wherein the contact element (131, 131', 231, 431, 531) and the locking element (130, 130', 230, 430, 530) are arranged on the steering wheel (112'), and the steering wheel (112') includes an opening (133, 133', 233) through which the catch element (120, 120', 420, 520) can be inserted at least partly into an outer surface of the steering wheel (112').

18. The steering wheel (112') according to claim 11, wherein the catch element (120, 120', 420, 520) is a catch hook or a catch clip, and the locking element (130, 130', 230, 430, 530) is a spring element, and the contact element (131, 131', 231, 431, 531) is a wire or a sheet metal.

19. The steering wheel (112') according to claim 11, wherein exactly one locking element (130, 130', 230, 430, 530) or exactly two locking elements (130, 130', 230, 430, 530) or exactly three locking elements (130, 130', 230, 430, 530) is/are arranged on the steering wheel (112'), and exactly one catch element (120, 120', 420, 520) or exactly two catch elements (120, 120', 420, 520) or exactly three catch elements (120, 120', 420, 520) is/are arranged on the airbag module (111, 211, 511), and exactly one horn contact (116, 116', 416, 516) or exactly two horn contacts (116, 116', 416, 516) or exactly three horn contacts (116, 116', 416, 516) is/are arranged on the airbag module (111, 211, 511).

20. A subassembly (110, 110', 510) comprising the steering wheel (112, 112') according to claim 11 and the airbag module (111, 111', 211, 511).

21. A method of connecting the airbag module (111, 111', 211, 511) to the steering wheel (112, 112', 512), wherein an airbag module (111, 111', 211, 511), and a steering wheel (112, 112', 512) are interconnected by means of a locking connection, wherein for said locking connection either the locking element (130, 230, 430, 530) is arranged on the airbag module (111, 211, 511) and the catch element (120, 420, 520) is arranged on the steering wheel (112), or wherein for said locking connection a locking element (130', 430) is arranged on the steering wheel (112') and a catch element (120', 420) is arranged on the airbag module (111'), comprising the steps of:
- establishing (301) electrical contact between the locking element (130, 130', 230, 430, 530) and a contact element (131, 131', 231, 431, 531),
- interrupting (302) the electrical contact between the locking element (130, 130', 230, 430, 530) and the contact element (131, 131', 231, 431, 531) while the locking connection is made,
- re-establishing (303) the electrical contact between the locking element (130, 130', 230, 430, 530) and the contact element (131, 131', 231, 431, 531) when or after the locking connection is made,
- wherein, after the locking connection has been made (304), the airbag module (111, 111') or a cover (236) of the airbag module (211, 511) is movable in a honking direction (A, H) relative to the steering wheel (112, 112', 512) to close the electrical contact between the contact element (131, 131', 231, 431, 531) and a horn contact (116, 116', 416, 516) in order to generate a horn signal.

22. The method according to claim 21, wherein the locking connection is made by interaction of the locking element (130, 130', 230, 430, 530) and the catch element (120, 120', 420, 520).

* * * * *